(12) United States Patent
Arrington (10) Patent No.: US 11,774,034 B1
(45) Date of Patent: Oct. 3, 2023

(54) DISCRETE PLUNGER HOLDER

(71) Applicant: Ronald Arrington, Covington, GA (US)

(72) Inventor: Ronald Arrington, Covington, GA (US)

( * ) Notice: Subject to any disclaimer, the term of this patent is extended or adjusted under 35 U.S.C. 154(b) by 0 days.

(21) Appl. No.: 17/745,940

(22) Filed: May 17, 2022

(51) Int. Cl.
*F16M 11/22* (2006.01)

(52) U.S. Cl.
CPC .......... *F16M 11/22* (2013.01); *E03C 2201/00* (2013.01)

(58) Field of Classification Search
CPC ...................................................... F16M 11/22
See application file for complete search history.

(56) References Cited

U.S. PATENT DOCUMENTS

| | | | |
|---|---|---|---|
| 4,008,933 A | 2/1977 | Wanek | |
| D403,906 S | 1/1999 | Gotti | |
| 5,927,492 A * | 7/1999 | Moore | A47B 81/02 220/636 |
| 6,035,456 A * | 3/2000 | Taylor | E03C 1/308 206/349 |
| 6,383,457 B1 | 5/2002 | Brown | |
| 6,926,137 B2 * | 8/2005 | Rudnick | B65D 43/26 206/349 |
| 7,861,859 B2 | 1/2011 | Reynolds | |
| 9,107,546 B2 * | 8/2015 | Gill | A47K 11/10 |
| 10,646,078 B1 | 5/2020 | Porzio | |
| 2002/0027402 A1 | 3/2002 | Hanser | |
| 2004/0003458 A1 * | 1/2004 | Nasco | A47K 17/00 206/349 |
| 2004/0036385 A1 | 2/2004 | Connerton | |
| 2008/0135432 A1 | 6/2008 | Cortinas | |
| 2015/0090717 A1 * | 4/2015 | Marcell | A47K 17/00 220/376 |
| 2015/0320269 A1 * | 11/2015 | Ward, Jr. | B44C 5/00 15/160 |
| 2016/0045088 A1 * | 2/2016 | Coleman | A47K 17/00 206/349 |
| 2022/0412064 A1 * | 12/2022 | Okkema | E03C 1/308 |

FOREIGN PATENT DOCUMENTS

WO 2004062426 7/2004

* cited by examiner

*Primary Examiner* — Anita M King
(74) *Attorney, Agent, or Firm* — Kyle A. Fletcher, Esq.

(57) ABSTRACT

The discrete plunger holder is a container. The discrete plunger holder comprises a pedestal structure, a containment structure, and a plunger. The containment structure forms a protected space used to store the plunger. The pedestal structure forms a framework that elevates the containment structure above a supporting surface. The pedestal structure transfers the loads of the containment structure and the plunger to the supporting surface.

11 Claims, 5 Drawing Sheets

DISCRETE PLUNGER HOLDER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of sanitary equipment. (A47K17/00)

SUMMARY OF INVENTION

The discrete plunger holder is a container. The discrete plunger holder comprises a pedestal structure, a containment structure, and a plunger. The containment structure forms a protected space used to store the plunger. The pedestal structure forms a framework that elevates the containment structure above a supporting surface. The pedestal structure transfers the loads of the containment structure and the plunger to the supporting surface.

These together with additional objects, features and advantages of the discrete plunger holder will be readily apparent to those of ordinary skill in the art upon reading the following detailed description of the presently preferred, but nonetheless illustrative, embodiments when taken in conjunction with the accompanying drawings.

In this respect, before explaining the current embodiments of the discrete plunger holder in detail, it is to be understood that the discrete plunger holder is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the discrete plunger holder.

It is therefore important that the claims be regarded as including such equivalent construction insofar as they do not depart from the spirit and scope of the discrete plunger holder. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
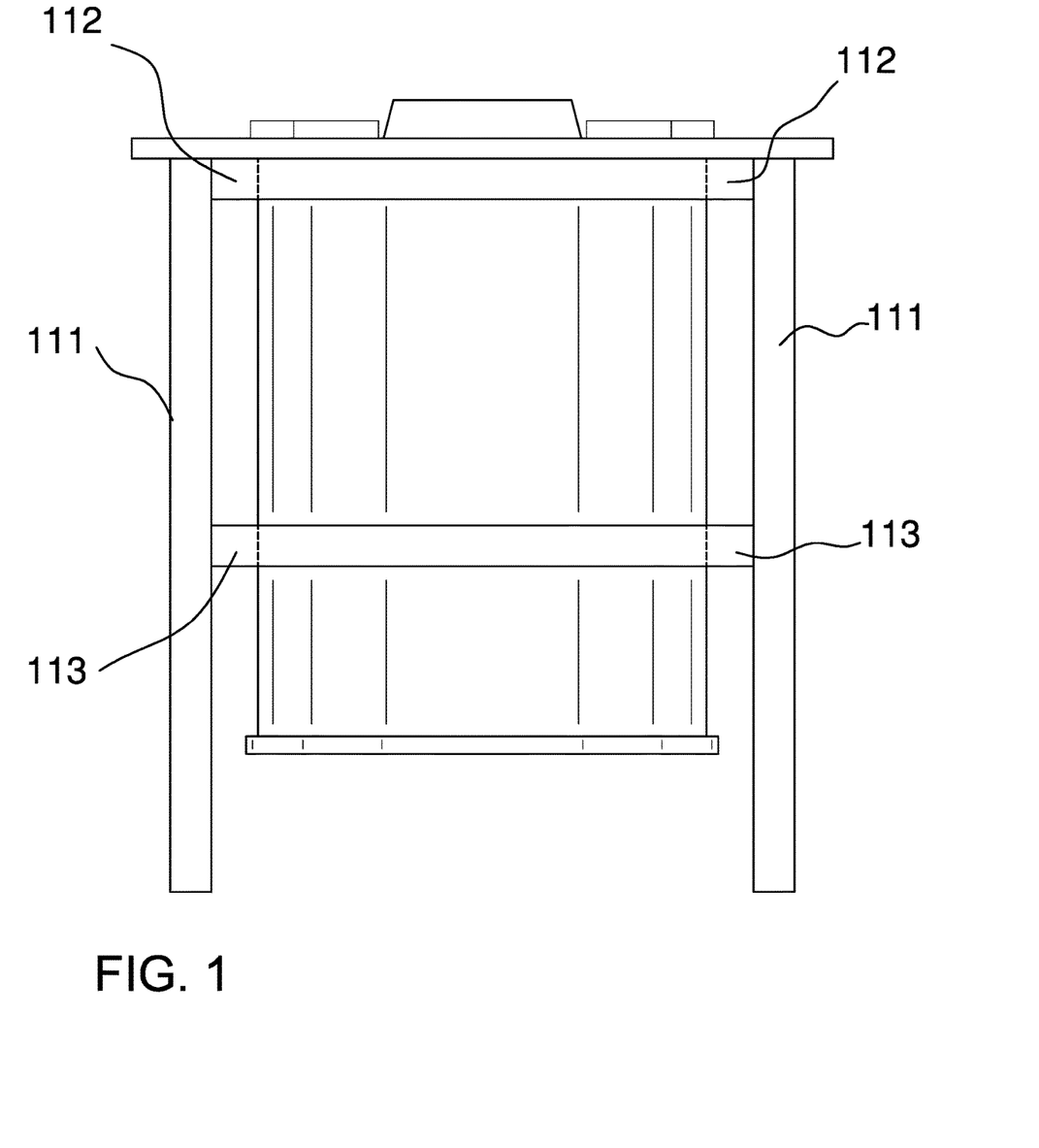
FIG. 1 is a front view of an embodiment of the disclosure.
Figure 2:
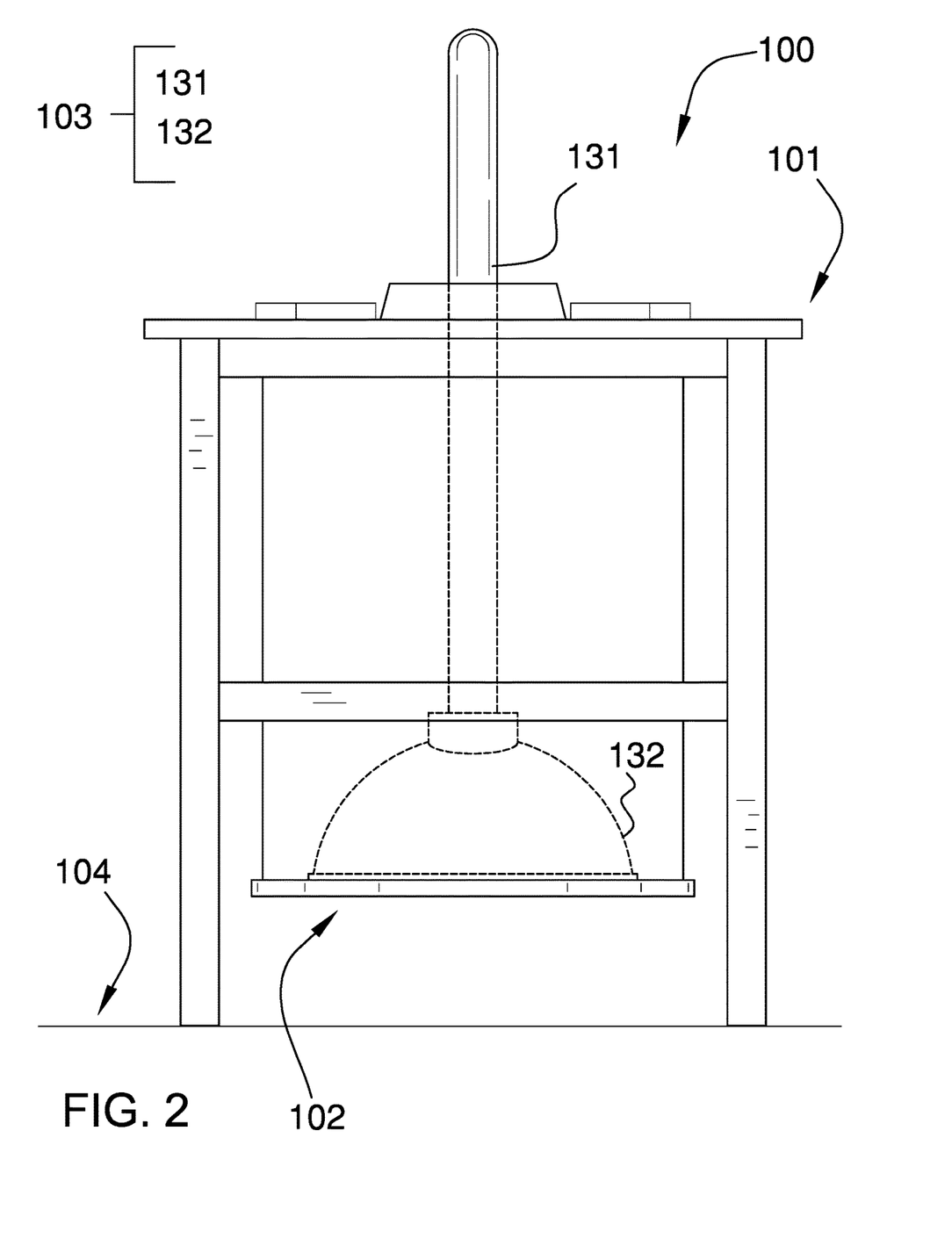
FIG. 2 is a side view of an embodiment of the disclosure.
Figure 3:
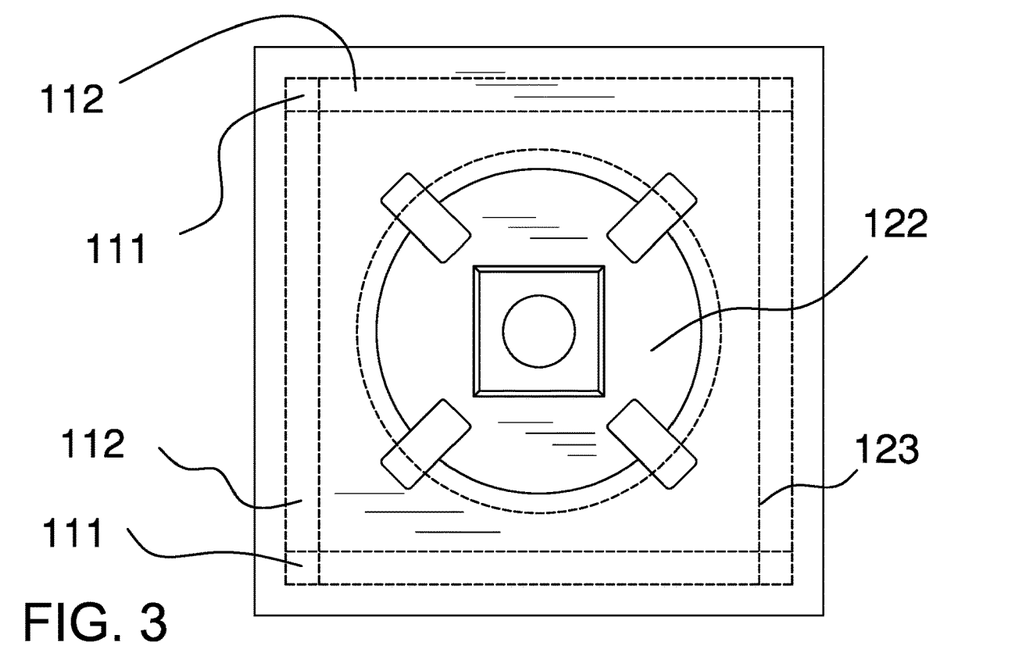
FIG. 3 is a top view of an embodiment of the disclosure.
Figure 4:
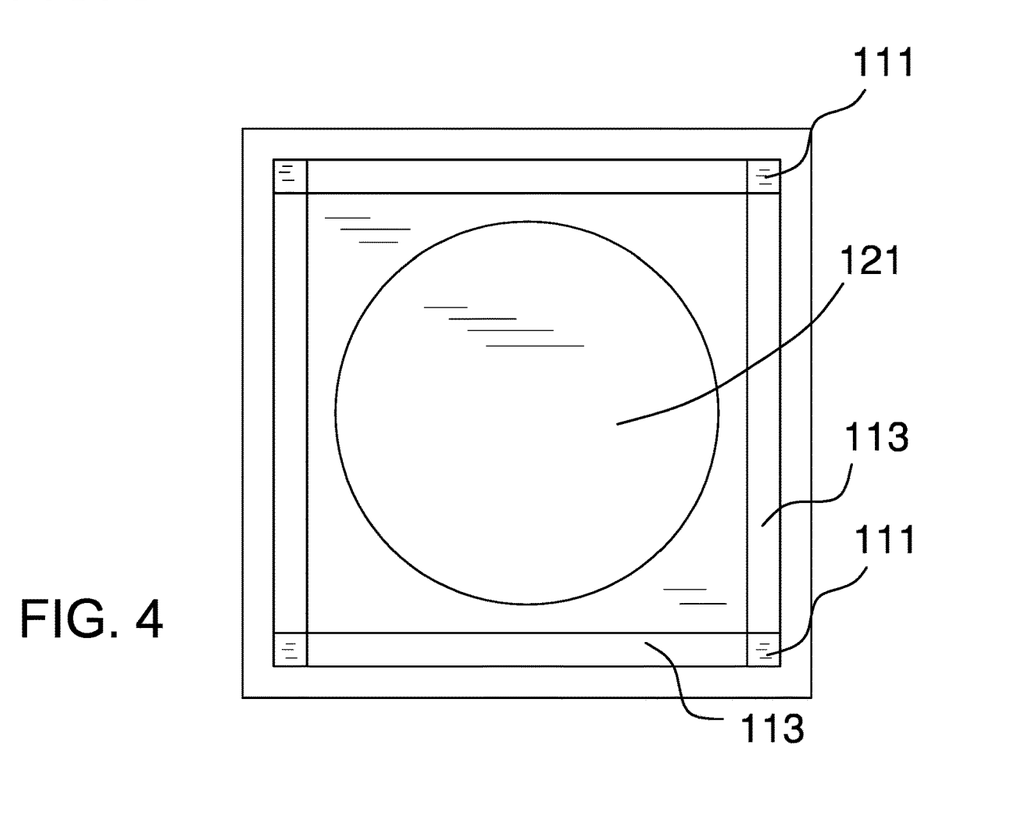
FIG. 4 is a bottom view of an embodiment of the disclosure.
Figure 5:
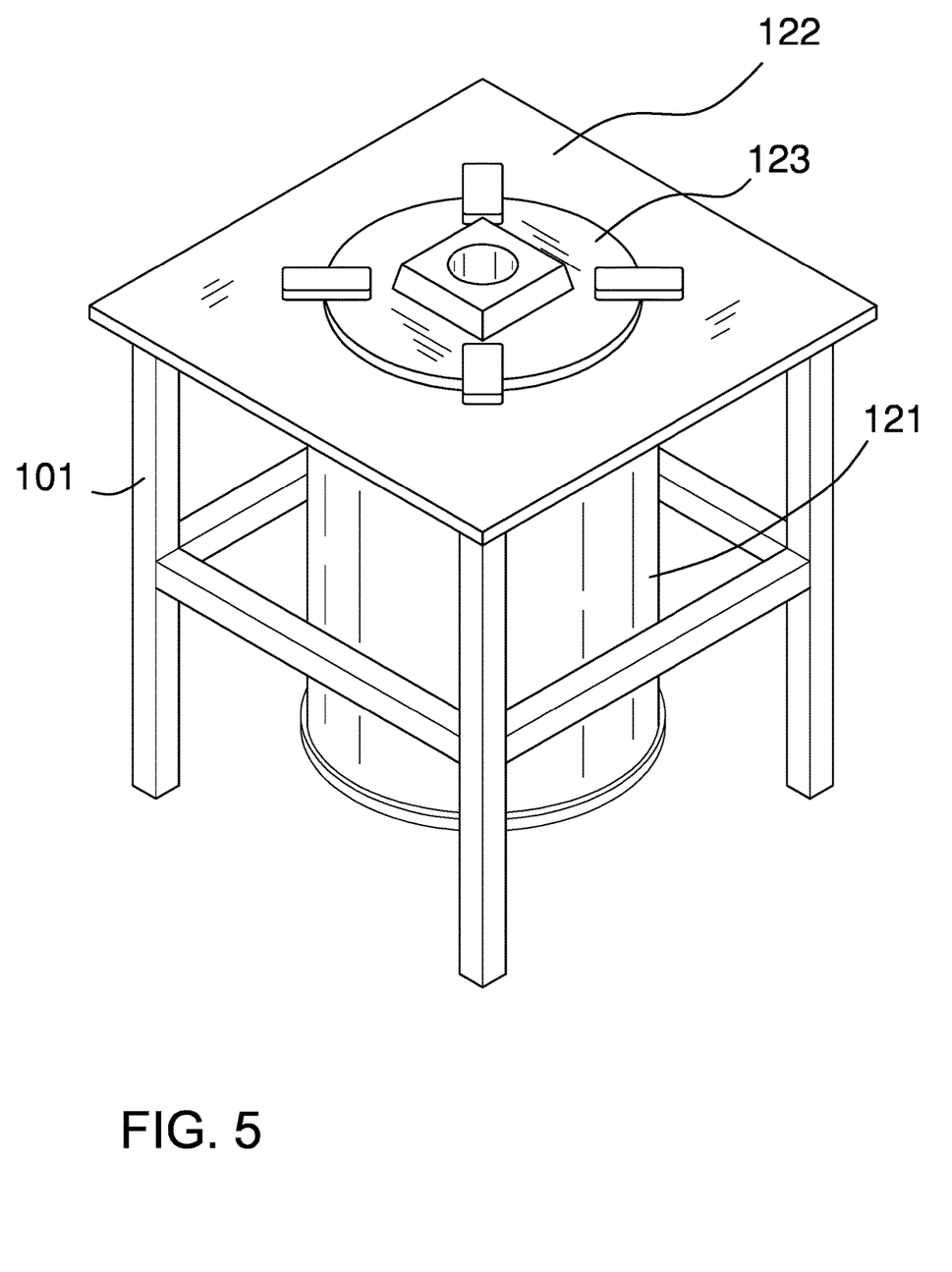
FIG. 5 is a perspective view of an embodiment of the disclosure.
Figure 6:
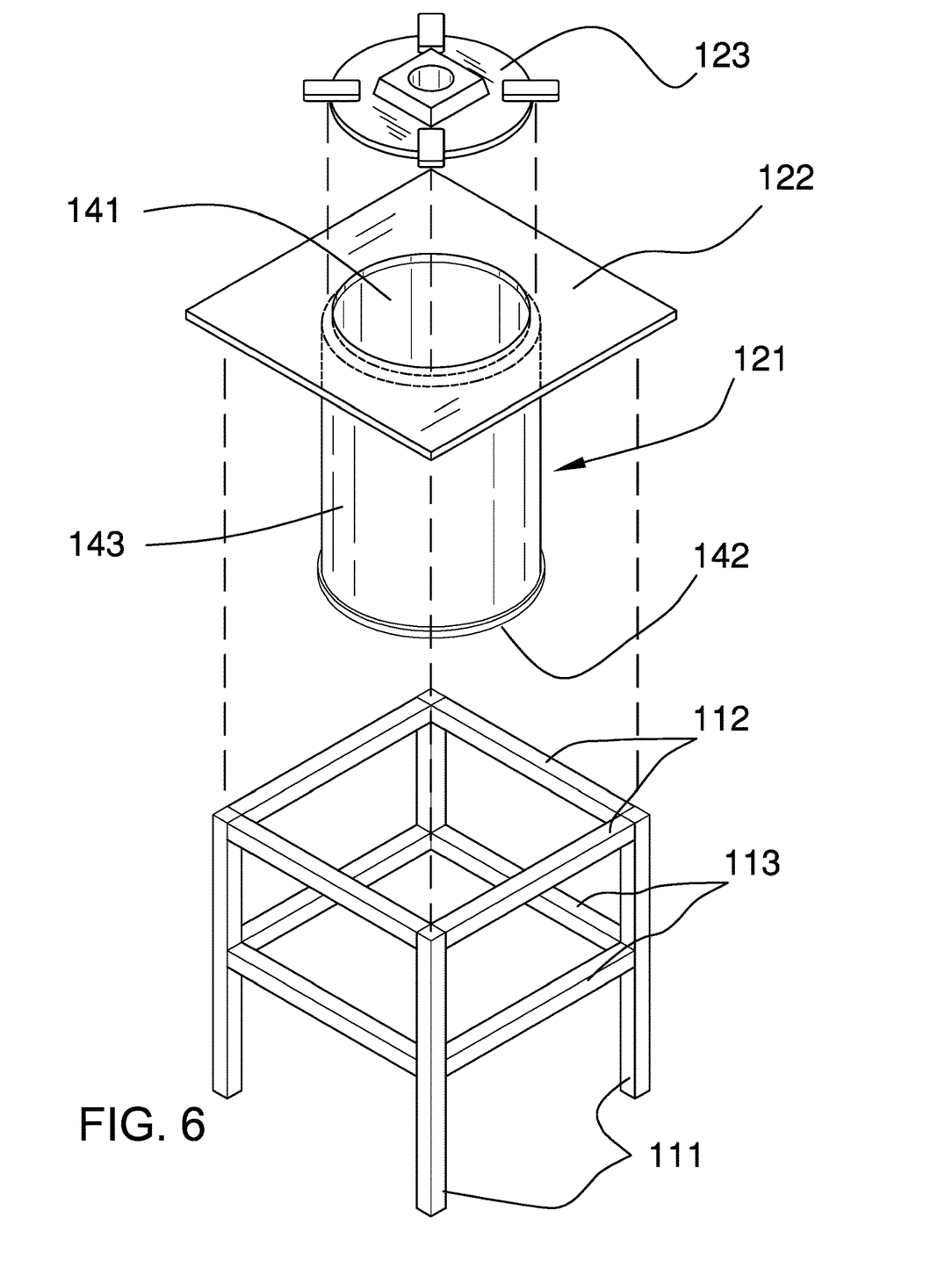
FIG. 6 is an exploded view of an embodiment of the disclosure.

Detailed reference will now be made to one or more potential embodiments of the disclosure, which are illustrated in FIGS. 1 through 6.

The discrete plunger holder 100 (hereinafter invention) is a container. The invention 100 comprises a pedestal structure 101, a containment structure 102, and a plunger 103. The containment structure 102 forms a protected space used to store the plunger 103. The pedestal structure 101 forms a framework that elevates the containment structure 102 above a supporting surface 104. The pedestal structure 101 transfers the loads of the containment structure 102 and the plunger 103 to the supporting surface 104.

The plunger 103 is a tool. The plunger 103 generates a vacuum used to clear blockages that occur in residential plumbing systems. The plunger 103 is defined elsewhere in this disclosure. The plunger 103 comprises a plunger 103 bulb 132 and a plunger 103 handle 131. The plunger 103 bulb 132 forms the working element of the plunger 103. The plunger 103 bulb 132 is an elastic structure. The plunger 103 bulb 132 mounts on a congruent end of the prism structure of the plunger 103 handle 131. The plunger 103 bulb 132 generates the motive forces used to dislodge material blocking a pipe. The plunger 103 bulb 132 is defined elsewhere in this disclosure. The plunger 103 handle 131 is a rigid structure. The plunger 103 handle 131 is a prism shaped structure. The plunger 103 handle 131 forms the handle of the plunger 103. The plunger 103 handle 131 forms a grip used to carry and manipulate the plunger 103.

The pedestal structure 101 is a pedestal. The pedestal structure 101 is a prism shaped structure. The pedestal structure 101 is a load bearing structure. The pedestal structure 101 is an openwork structure. The pedestal structure 101 is a hollow structure. The pedestal structure 101 forms a framework. The pedestal structure 101 elevates the containment structure 102 and the plunger 103 above the supporting surface 104. The pedestal structure 101 forms a load path that transfers the load of the containment structure 102 and the plunger 103 to the supporting surface 104. The pedestal structure 101 comprises a plurality of stanchion structures 111, a plurality of superior beams 112, and a plurality of cross braces 113.

Each stanchion structure selected from the plurality of stanchion structures 111 is a stanchion. Each stanchion structure selected from the plurality of stanchion structures 111 is a rigid structure. Each stanchion structure selected from the plurality of stanchion structures 111 is a prism shaped structure. The center axis of the prism shape of each stanchion structure selected from the plurality of stanchion structures is vertically oriented. Each stanchion structure selected from the plurality of stanchion structures 111 is identical.

Each stanchion structure selected from the plurality of stanchion structures 111 is a load bearing structure. The containment structure 102 mounts on the superior congruent ends of each pedestal structure 101. The plurality of stanchion structures 111 elevate the containment structure 102 above the supporting surface 104. The plurality of stanchion structures 111 transfer the load of the containment structure 102 and the plunger 103 to the supporting surface 104.

Each superior beam selected from the plurality of superior beams 112 is a beam. Each superior beam selected from the plurality of superior beams 112 is a rigid structure. Each superior beam selected from the plurality of superior beams 112 is a prism shaped structure. The center axis of the prism shape of each superior beam selected from the plurality of superior beams 112 is horizontally oriented. Each superior beam selected from the plurality of superior beams 112 attaches a stanchion structure selected from the plurality of stanchion structures 111 to an adjacent stanchion structure selected from the plurality of stanchion structures 111. Each superior beam selected from the plurality of superior beams 112 forms a bracing structure that transfers forces between the initially selected stanchion structure and the adjacent stanchion structure.

Each cross brace selected from the plurality of cross braces 113 is a beam. Each cross brace selected from the plurality of cross braces 113 is a rigid structure. Each cross brace selected from the plurality of cross braces 113 is a prism shaped structure. The center axis of the prism shape of each superior beam selected from the plurality of cross braces 113 is horizontally oriented. Each cross brace selected from the plurality of cross braces 113 attaches a stanchion structure selected from the plurality of stanchion structures 111 to an adjacent stanchion structure selected from the plurality of stanchion structures 111. Each cross brace selected from the plurality of cross braces 113 forms a bracing structure that transfers forces between the initially selected stanchion structure and the adjacent stanchion structure.

The containment structure 102 forms a container. The containment structure 102 forms the protected space that contains the plunger 103. The containment structure 102 is a prism shaped structure. The containment structure 102 has a pan shape. The containment structure 102 inserts into the hollow structure of the pedestal structure 101. The pedestal structure 101 suspends the containment structure 102 above the supporting surface 104. The containment structure 102 comprises a pan structure 121, an undercut ledge structure 122, and a lid structure 123.

The pan structure 121 is a prism shaped structure. The pan structure 121 is a hollow structure. The pan structure 121 has a pan shape. The hollow interior of the pan structure 121 forms the protected space that contains the plunger 103. The pan structure 121 comprises an open face 141, a closed face 142, and a lateral face 143. The open face 141 forms the open face 141 of the pan shape of the pan structure 121. The open face 141 forms the superior face of the pan structure 121. The closed face 142 forms the closed face 142 of the pan shape of the pan structure 121. The closed face 142 forms the face of the closed face 142 that is distal from the open face 141. The lateral face 143 forms the lateral face 143 of the pan structure 121. The lateral face 143 forms the vertically oriented containment surfaces of the pan structure 121.

The undercut ledge structure 122 is a disk shaped structure. The undercut ledge structure 122 is a load bearing structure. The undercut ledge structure 122 attaches to the lateral face 143 of the pan structure 121. The undercut ledge structure 122 attaches to the pan structure 121 such that the superior congruent end of the disk structure of the undercut ledge structure 122 projects radially away in all directions from the center axis of the prism structure of the pan structure 121. The undercut ledge structure 122 attaches to the pan structure 121 such that the superior congruent end of the disk structure of the undercut ledge structure 122 aligns with the open face 141 of the pan structure 121. The undercut ledge structure 122 attaches to the pan structure 121 such that the superior congruent end of the disk structure of the undercut ledge structure 122 is horizontally oriented.

The diameter of the undercut ledge structure 122 is sized such that the undercut ledge structure 122 will simultaneously rest on the superior congruent end of each stanchion structure selected from the plurality of stanchion structures 111. The undercut ledge structure 122 suspends the pan structure 121 above the supporting surface 104. The pan structure 121 attaches to the undercut ledge structure 122 such that the undercut ledge structure 122 transfers the full load of the pan structure 121 and the plunger 103 to the pedestal structure 101. The open face 141 is accessible through the undercut ledge structure 122. The undercut ledge is defined elsewhere in this disclosure.

The lid structure 123 is a lid. The lid structure 123 is a disk shaped structure. The lid structure 123 is geometrically similar to the open face 141 of the pan structure 121. The lid structure 123 encloses the plunger 103 within the protected space formed by the pan structure 121 by enclosing the open face 141 of the pan structure 121. The lid structure 123 further comprises a handle aperture 124. The handle aperture 124 is a negative space formed through the congruent ends of the disk structure of the lid structure 123. The span of the length of the inner diameter of the handle aperture 124 is greater than the span of the length of the outer diameter of the plunger 103 handle 132 such that the plunger 103 handle 132 inserts through the handle aperture 124 as the lid structure 123 encloses the open face 141 of the pan structure 121.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Aperture: As used in this disclosure, an aperture is a prism-shaped negative space that is formed completely through a structure or the surface of a hollow structure.

Barrier: As used in this disclosure, a barrier is a physical obstacle that forms a boundary between a first space and a second space. The barrier prevents the passage of an object between the first space and the second space.

Beam: As used in this disclosure, a beam is a horizontally oriented load bearing structure.

Brace: As used in this disclosure, a brace is a rigid structural element that interconnects a first object with a second object to form a resulting object. The brace forms an energy transfer structure that distributes and shares the forces applied to the resulting object between the first object and the second object. The brace is used to support, stabilize, or otherwise steady an object.

Cant: As used in this disclosure, a cant is an angular deviation from one or more reference lines (or planes) such as a vertical line (or plane) or a horizontal line (or plane).

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Container: As used in this disclosure, a container is a structure that forms a protected space (or protection space) used to store and transport an object. The term containment structure is a synonym for container.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Exterior: As used in this disclosure, the exterior is used as a relational term that implies that an object is not contained within the boundary of a structure or a space.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Framework: As used in this disclosure, a framework refers to the substructure of an object that forms the load path for the object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Grip: As used in this disclosure, a grip is an accommodation formed on or within an object that allows the object to be grasped or manipulated by a hand.

Handle: As used in this disclosure, a handle is an object by which a tool, object, or door is held or manipulated with the hand.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Inner Dimension: As used in this disclosure, the term inner dimension describes the span from a first inside or interior surface of a container to a second inside or interior surface of a container. The term is used in much the same way that a plumber would refer to the inner diameter of a pipe.

Interior: As used in this disclosure, the interior is used as a relational term that implies that an object is contained within the boundary of a structure or a space.

Ledge: As used in this disclosure, a ledge is a horizontal surface that projects away from a vertical structure. A ledge that projects away from, or overhangs, the vertical structure in the manner of a cantilever is referred to as an undercut ledge.

Lid: As used in this disclosure, a lid is a removable cover that is placed over an opening of a hollow structure to enclose the hollow structure.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Openwork: As used in this disclosure, the term openwork is used to describe a structure, often a surface, which is formed with one or more openings that allow for visibility and fluid flow through the structure. Wrought work and meshes are forms of openwork.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Pedestal: As used in this disclosure, a pedestal is an intermediary load bearing structure that forms a load path between a supporting surface and an object, structure, or load.

Perimeter: As used in this disclosure, a perimeter is one or more curved or straight lines that bounds an enclosed area on a plane or surface. The perimeter of a circle is commonly referred to as a circumference.

Plunger: As used in this disclosure, a plunger is a hand tool that is used to clear a blocked pipe in a plumbing system. The plunger comprises a bulb formed from an elastomeric material and a handle. The handle manipulates the bulb such that the volume in the bulb changes in such a manner that pressure differentials are created within the plumbing system. The generated pressure differentials provided the force required to dislodge the material blocking the pipe.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a negative space within which an object is stored. The protected space is enclosed by a barrier structure that: a) prevents damage to the object contained within the protected space; b) maintains an environment suitable within the protected space that is appropriate for the object; protects the object within the protected space from potential dangers that are outside of the protected space; or, d) maintaining the privacy of the object within the protected space.

Private: As used in this disclosure, the term private refers to the limitation of use of an object to a one or more individuals. The term privacy refers to maintaining an object or individual in a location where the object or individual can be neither observed nor disturbed.

Stanchion: As used in this disclosure, a stanchion refers to a vertically oriented prism-shaped pole, post, or support.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Suspend: As used in this disclosure, to suspend an object means to support an object such that the inferior end of the object does not form a significant portion of the load path of the object.

Tool: As used in this disclosure, a tool is a device, an apparatus, or an instrument that is used to carry out an activity, operation, or procedure. A tool generally comprises a working element and a handle.

Vacuum: As used in this disclosure, vacuum is used to describe a first space that contains gas at a reduced gas pressure relative to the gas pressure of a second space. If the first space and the second space are connected together, this pressure differential will cause gas from the second space to move towards the first space until the pressure differential is eliminated.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Working Element: As used in this disclosure, the working element of a tool is the physical element on the tool that performs the actual activity, operation, or procedure the tool is designed to perform. For example, the cutting edge of a blade is the working element of a knife.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A discrete plunger holder comprising
a pedestal structure, a containment structure, and a plunger;
wherein the containment structure forms a protected space used to store the plunger;
wherein the pedestal structure forms a framework that elevates the containment structure above a supporting surface;
wherein the discrete plunger holder is a container;
wherein the pedestal structure transfers the loads of the containment structure and the plunger to the supporting surface;
wherein the plunger is a tool;
wherein the plunger comprises a plunger bulb and a plunger handle;
wherein the plunger bulb mounts on a congruent end of the plunger handle;
wherein the pedestal structure is a pedestal;
wherein the pedestal structure is a load bearing structure;
wherein the pedestal structure is an openwork structure;
wherein the pedestal structure is a hollow structure; and
wherein the pedestal structure elevates the containment structure and the plunger above the supporting surface.

2. The discrete plunger holder according to claim 1
wherein the containment structure forms a container;
wherein the containment structure has a pan shape; and
wherein the containment structure inserts into the hollow structure of the pedestal structure.

3. The discrete plunger holder according to claim 2
wherein the pedestal structure comprises a plurality of stanchion structures, a plurality of superior beams, and a plurality of cross braces;
wherein each superior beam selected from the plurality of superior beams forms a bracing structure that transfers forces between an initially selected stanchion structure and the adjacent stanchion structure; and
wherein each cross brace selected from the plurality of cross braces forms a bracing structure that transfers forces between the initially selected stanchion structure and an adjacent stanchion structure.

4. The discrete plunger holder according to claim 3
wherein each stanchion structure selected from the plurality of stanchion structures is a stanchion;
wherein each stanchion structure selected from the plurality of stanchion structures is a rigid structure;
wherein a center axis of each stanchion structure selected from the plurality of stanchion structures is vertically oriented;
wherein each stanchion structure selected from the plurality of stanchion structures is identical;
wherein each stanchion structure selected from the plurality of stanchion structures is a load bearing structure;
wherein the containment structure mounts on superior congruent ends of each pedestal structure; and
wherein the plurality of stanchion structures elevate the containment structure above the supporting surface.

5. The discrete plunger holder according to claim 4
wherein each superior beam selected from the plurality of superior beams is a beam;
wherein each superior beam selected from the plurality of superior beams is a rigid structure;
wherein the center axis of each superior beam selected from the plurality of superior beams is horizontally oriented; and
wherein each superior beam selected from the plurality of superior beams attaches to the initially selected stanchion structure selected from the plurality of stanchion structures to an adjacent stanchion structure selected from the plurality of stanchion structures.

6. The discrete plunger holder according to claim 5
wherein each cross brace selected from the plurality of cross braces is a beam;
wherein each cross brace selected from the plurality of cross braces is a rigid structure;
wherein the center axis of a superior beam selected from the plurality of cross braces is horizontally oriented; and
wherein each cross brace selected from the plurality of cross braces attaches a stanchion structure selected from the plurality of stanchion structures to an adjacent stanchion structure selected from the plurality of stanchion structures.

7. The discrete plunger holder according to claim 6
wherein the containment structure comprises a pan structure, an undercut ledge structure, and a lid structure;
wherein the undercut ledge structure attaches to the pan structure; and
wherein the lid structure encloses the plunger within the pan structure.

8. The discrete plunger holder according to claim 7
wherein the pan structure is a hollow structure;
wherein the pan structure has a pan shape;
wherein a hollow interior of the pan structure forms the protected space that contains the plunger;
wherein the pan structure comprises an open face, a closed face, and a lateral face;
wherein the open face forms the open face of the pan shape of the pan structure;
wherein the open face forms a superior face of the pan structure;
wherein the closed face forms the closed face of the pan shape of the pan structure;
wherein the closed face forms the face of the closed face that is distal from the open face;

wherein the lateral face forms the lateral face of the pan structure; and wherein the lateral face forms the vertically oriented containment surfaces of the pan structure.

9. The discrete plunger holder according to claim 8
wherein the undercut ledge structure is a disk shaped structure;

wherein the undercut ledge structure is a load bearing structure;

wherein the undercut ledge structure attaches to the lateral face of the pan structure;

wherein the undercut ledge structure attaches to the pan structure such that the superior congruent end of the disk structure of the undercut ledge structure projects radially away in all directions from the center axis of the pan structure;

wherein the undercut ledge structure attaches to the pan structure such that the superior congruent end of the disk structure of the undercut ledge structure aligns with the open face of the pan structure;

wherein the undercut ledge structure attaches to the pan structure such that the superior congruent end of the disk structure of the undercut ledge structure is horizontally oriented;

wherein the diameter of the undercut ledge structure is sized such that the undercut ledge structure will simultaneously rest on the superior congruent end of each stanchion structure selected from the plurality of stanchion structures;

wherein the undercut ledge structure suspends the pan structure above the supporting surface; and wherein the pan structure attaches to the undercut ledge structure such that the undercut ledge structure transfers the full load of the pan structure and the plunger to the pedestal structure.

10. The discrete plunger holder according to claim 9
wherein the lid structure is a lid;

wherein the lid structure is a disk shaped structure;

wherein the lid structure is geometrically similar to the open face of the pan structure; and wherein the lid structure encloses the plunger within the protected space formed by the pan structure by enclosing the open face of the pan structure.

11. The discrete plunger holder according to claim 10
wherein the lid structure further comprises a handle aperture;

wherein the handle aperture is a negative space formed through the congruent ends of the disk structure of the lid structure; and wherein the span of the length of the inner diameter of the handle aperture is greater than the span of the length of the outer diameter of the plunger handle such that the plunger handle inserts through the handle aperture as the lid structure encloses the open face of the pan structure.

\* \* \* \* \*